United States Patent [19]
Usuki et al.

[11] Patent Number: 5,142,003
[45] Date of Patent: Aug. 25, 1992

[54] AGENTS TO PREVENT POLYMER SCALE DEPOSITION AND A METHOD THEREFOR

[75] Inventors: Masahiro Usuki; Mikio Watanabe; Susumu Ueno, all of Ibaragi, Japan

[73] Assignee: Shin-Etsu Chemical Company, Limited, Tokyo, Japan

[21] Appl. No.: 717,567

[22] Filed: Jun. 19, 1991

[30] Foreign Application Priority Data

Jun. 19, 1990 [JP] Japan .................................. 2-160294

[51] Int. Cl.$^5$ ............................................ C08F 110/00
[52] U.S. Cl. ........................................ 526/62; 526/74; 526/348
[58] Field of Search ............................ 526/62, 74, 348

[56] References Cited

U.S. PATENT DOCUMENTS 4,105,839  8/1978  Koyanagi et al. .................... 526/62
4,272,622  6/1981  Kitamura et al. .................... 526/62

Primary Examiner—Joseph L. Schofer
Assistant Examiner—Tom Weber
Attorney, Agent, or Firm—Millen, White & Zelano

[57] ABSTRACT

Scale deposits during polymerization of monomers containing ethylene-type double bonds are prevented by coating the reactor walls and parts with cationic dyes oxidized with hydrogen peroxide.

8 Claims, No Drawings

AGENTS TO PREVENT POLYMER SCALE DEPOSITION AND A METHOD THEREFOR

BACKGROUND OF THE INVENTION

This invention relates to agents to prevent or minimize polymer scale deposition and a method to prevent polymer scale deposition during the polymerization of monomers which comprise an ethylene type double bond.

Polymer manufacturing processes involving polymerizing monomers in a polymerization vessel have the problem of polymer scale deposition on the vessel inner walls. Such depositions reduce the heat transfer of the vessel walls, resulting in lowering of productivity. Further, any released scale entering into the polymer product results in a reduction of polymer quality. The removal of such scale usually requires a great deal of labor and time. The work necessary to remove the scale causes a very serious health problem to the workers, since unreacted toxic monomer is absorbed in the polymer scale.

During the polymerization of monomers with an ethylene type double bond, a conventional method to prevent polymer scale deposits on the inner walls of the reactor is to employ on the walls a coating of appropriate substances which prevent polymer scale deposition. Such appropriate substances already known are, for example, specific polar compounds (JP70-30343), dyes and pigments (JP70-30835), aromatic amine compounds (JA76-50887), and products from the reaction between phenolic compounds and aromatic aldehydes (JA80-54317). These substances are effective to prevent polymer deposits during the polymerization of vinyl halogenide monomers such as vinyl chloride or of a monomeric mixture composed mainly of vinyl halogenides.

When the monomers have an ethylene type double bond, such as styrene, alpha-methylstyrene, acrylic acid ester, and acrylonitrile, such substances are no longer effective for scale deposit prevention. Monomers with an ethylene type double bond can be expressed by the formula (I):

$$CH_2=CXY \qquad (I)$$

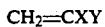

where X is a hydrogen atom or a methyl group and Y is a hydrogen atom, an alkyl group, or a group of the formulae —COOH, —COOM (wherein M is an alkali metal or ammonium ion), —COOR (wherein R, here and below, is alkyl group), —OCOR, —OR, —CN, —C$_6$H$_5$, —C$_6$H$_4$Z (wherein Z is a hydrogen atom, —OH, —CH$_3$, or a group of the formula —CH=CH$_2$), or a group of the formula —CH=CH$_2$. These monomers tend to dissolve coatings formed by such conventional polymer scale deposit inhibitors. As a result, they lead to a loss of a portion or all of the coating film and eventually to a loss of the scale prevention effects. Styrene, alpha-methylstyrene, acrylic acid ester, and acrylonitrile are monomers which have extremely large solubility towards such coating films; therefore, it is difficult to prevent polymer scale deposition effectively during the polymerization of these compounds. Particularly when the coated polymerization reactor is used repeatedly, it becomes difficult to achieve the originally intended scale prevention effect. Therefore, usage of the conventional polymer scale deposit inhibitors necessitates that a fresh coating film be prepared for every polymerization batch, which makes improving productivity difficult.

Inner walls of polymerization vessels made of stainless steels and other types of steels tend to deposit scales even easier than glass-lined walls.

SUMMARY OF THE INVENTION

This invention provides agents and a method to prevent or minimize polymer scale deposits during the polymerization and copolymerization of monomers which have an ethylene type double bond, expressed by the formula (I). The agents and the methods of this invention are certainly effective to prevent polymer scale deposits on vessel inner walls, regardless of the choice of vessel wall materials.

In order to achieve this result, this invention offers polymer scale deposit inhibitors which comprise cationic dyes oxidized with hydrogen peroxide for use in the polymerization of the following monomers. These are monomers which comprise an ethylene type double bond which are expressed by the formula (I):

$$CH_2=CXY \qquad (I)$$

where X is a hydrogen atom or a methyl group and Y is a hydrogen atom, an alkyl group, or group of the formulae: —COOH, —COOM (wherein M is an alkali metal or ammonium ion), —COOR (wherein R, here and below, is alkyl group) —OCOR, —OR, —CN, —C$_6$H$_5$, —C$_6$H$_4$Z (wherein Z is a hydrogen atom, —OH, —CH$_3$, or a group of the formula —CH=CH$_2$), or a group of the formula —CH=CH$_2$.

This invention also provides a method to prevent polymer scale deposits within a vessel during polymerization of monomers with an ethylene type double bond expressed by the general formula (I). The polymer scale preventive method of this invention comprises conducting the polymerization process within a reaction vessel which is coated with cationic dye prepared by oxidation with hydrogen peroxide.

Polymer scale deposit inhibitors of this invention comprise a component which is a cationic dye prepared by oxidation with hydrogen peroxide. Cationic dyes which can be used as raw materials for preparation of the oxidized cationic dyes (A) include, for example, azine dyes such as C.I. Basic Red 2, C.I. Basic Blue 16, C.I. Basic Black 2, and C.I. Solvent Black 5, 7; acridine dyes such as C.I. Basic Orange 14 and 15; triphenylmethane dyes such as C.I. Basic Blue 1, 5, 7, 26, C.I. Basic Violet 3 and 14; thiazine dyes such as C.I. Basic Blue 9, 24, 25, C.I. Basic Yellow 1 and C.I. Basic Green 5; methine dyes such as C.I. Basic Red 12 and C.I. Basic Yellow 11; diphenyl and triphenyl methane dyes such as C.I. Basic Yellow 2, C.I. Solvent Violet 8, C.I. Solvent Blue 2 and 73; oxazine dyes such as C.I. Basic Blue 6 and 12; azo dyes such as C.I. Solvent Yellow 2, 6, 14, 15, 16, 19, 21, 56, C.I. Solvent Red 1, 8, 23, 24, 25, 27, 100, 109, 121, C.I. Solvent Brown 3, 5, 20, 37, C.I. Solvent Black 3, 22, 23, C.I. Basic Orange 2 and C.I. Basic Brown 1; xanthene dyes such as C.I. Basic Violet 10 and C.I. Basic Red 1; phthalocyanine dyes such as C.I. Solvent Blue 55; and anthraquinone dyes such as C.I. Solvent Blue 11, 12, 36, C.I. Dispersed Violet, and C.I. Solvent Green 3. They can be used individually or by combinations of two or more.

Among these cationic dyes, C.I. Solvent Black 3, 5, 7, 22, and 23; and C.I. Solvent Blue 2, 11, 12, 36, 55, and 73 are most preferred as scale deposit inhibitors.

These cationic dyes are oxidized by hydrogen peroxide in order to improve their resistance to monomers when employed as a coating film. Hydrogen peroxide is added to cationic dyes by a weight percent ratio ranging from 0.1/1 to 30/1, most preferably 1/1 to 20/1. A lesser ratio of hydrogen peroxide to cationic dyes will result in a coating film which does not have enough resistance towards monomers to achieve good scale deposit prevention. The effect of preventing scale deposits will not improve beyond a certain level, even when a higher concentration of hydrogen peroxide is added.

The oxidation of the dyes can be initiated by the addition of the hydrogen peroxide. The quenching of the cationic dye oxidation is preferably carried out by the addition of hydrogen peroxidases. Such hydrogen peroxidases include, for example, iron porphyrin enzymes such as peroxidase, catalase, and cytochrome oxidase; copper enzymes such as ascorbate oxidase, laccalase, and terocinase; pyridine enzymes such as lactate dehydrogenase, glucose-6-phosphate dehydrogenase, and isocitrate dehydrogenase; and flavin enzymes such as xanthine oxidase, D-amino acid oxidase, and L-amino acid oxidase. These are used individually or by combining two or more kinds of peroxidases.

Among these hydrogen peroxidases, peroxidase, catalase, and D- and L-ascorbate oxidases are most preferred.

Only a small amount of these hydrogen peroxidases is enough to be effective for said hydrogen peroxide quenching. Hydrogen peroxidase is added to hydrogen peroxide by a weight percent ratio ranging from 0.01/100 to 20/100, most preferably from 0.1/100 to 5/100. A lesser ratio of hydrogen peroxidase to hydrogen peroxide will not complete the decomposition and residual hydrogen peroxide causes a lower stability of the coating solution.

The oxidized dye alone as a polymer scale deposit inhibitor will provide the originally intended scale prevention effects. However, in order to enhance the effect, it is preferred to add at least one compound from the following groups: (B) inorganic colloids, (C) water-soluble polymer compounds, and (D) water-soluble organic acids.

The inorganic colloid (B) should have an average particle size less than 100 μm, and be dispersible in water and solvents compatible with water. It functions as a binder to facilitate formation of a film which is insoluble in water and the monomers. Examples of (B) inorganic colloids include gold colloids, silver colloids, sulfur colloids, ferrous hydroxide colloids, stannic acid colloids, silicic acid colloids, manganese dioxide colloids, molybdenum oxide colloids, barium sulfate colloids, vanadium pentoxide colloids, aluminum hydroxide colloids and lithium silicate colloids. These colloids can be prepared by mechanical crushing, ultrasound irradiation, electrical dispersion, and by chemical methods. These inorganic colloids are used alone or in combinations of two or more types.

Among these (B) components, silicic acid colloids, aluminum hydroxide colloids and lithium silicate colloids are more preferred. Among silicic acid colloids the most preferred are, for example, aqueous type silica sol; alcohol type silica sols such as methanol silica sol, isopropanol silica sol, and butanol silica sol; ethylene glycol silica sol; and methyl cellosolve silica sol.

The water-soluble polymer (C) should possess a water solubility of 0.0005 g/ml or greater at 20° C. It functions to form the hydrophilic film. Examples of (C) water-soluble polymer compounds include sulfomethylates of polyacrylamide; polyacrylic acid; alginic acid, copolymers of acrylamide and vinylsulfonic acid, polymethacrylic acid, and their alkali metal salts such as sodium and potassium salts, and their ammonium salts; compounds which have a carboxyl group or sulfonic group in the side chain such as carboxymethyl cellulose, anionic polymer compounds such as polyvinyl sulfuric acid, and their alkali metal salts and ammonium salts, and amphoteric polymer compounds such as glue, gelatine, casein, and albumin. These are employed by themselves or in combination of two or more.

Among these (C) compounds, polyacrylic acid is preferred. Especially highly polymerized polyacrylic acid, of which a 20% aqueous solution possesses more than a 10000cP viscosity, is the most preferred to prepare a superior coating with good water resistance and durability.

The water-soluble organic acid (D) should possess a water solubility of 0.01 g/ml or greater at 20° C., and a pKa value of 2.0–14.0. It functions to render the film insoluble and at the same time hydrophilic.

Suitable water-soluble organic acids (D) include, for example, formic acid, acetic acid, oxalic acid, lactic acid, maleic acid, glycollic acid, thioglycollic acid, p-toluenesulfonic acid, phytinic acid and their acidic salts. These are used alone or in combination of two or more kinds.

Among these (D) components, the most preferred types are p-toluene sulfonic acid, phytinic acid, and their acidic salts.

All these (B), (C), and (D) components are effective to make the coating film more hydrophilic and insoluble, and to form a thicker film, in addition to improving the scale preventive effects.

The polymer scale deposit inhibitors of this invention comprise the component (A), with additives from (B), (C), and (D) as necessary. Coating films of these inhibitors on the reaction vessel inner walls keep such walls from having scale deposition. The polymer scale deposit inhibitors discussed here include component (A) by itself, or a mixture of (A) component and more than one component from said (B), (C), and (D) groups. The invented polymer scale deposit inhibitors also include these compounds under solution conditions, by being dispersed or dissolved into appropriate solvents. A polymerization vessel coating process generally employs such a solution (coating solution).

Suitable solvents used to prepare said coating solutions include, for example, water; alcoholic solvents such as methanol, ethanol, and n-propyl alcohol; fatty hydrocarbon type solvents such as n-hexane and n-heptane; aromatic hydrocarbon type solvents such as toluene, benzene, and xylene; halogenized hydrocarbon type solvents such as chloromethylene, 1-chlorobutane, dichloroethylene, and 1,1,2-trichloroethane; ketone type solvents such as acetone and methylethylketone; ester type solvents such as methyl formate and ethylacetate; and ether type solvents such as ethyl ether, 1,4-dioxane, and ethylene glycol monomethyl ether. These solvents are used alone, or by mixing solvents of two or more kinds. The most preferred solvents among these are water and alcohol type solvents such as methanol and ethanol.

Below is an example for the preparation of the coating solution. Cationic dye is dispersed or dissolved into an appropriate solvent. The concentration of dye is in the range of 0.001 to 5 wt%, preferably 0.005 to 1 wt%. At a temperature from room temperature to 100° C., hydrogen peroxide at the mentioned weight ratio is added to the above prepared solution or suspension. From several minutes to hours after the beginning of the oxidation of the cationic dyes, hydrogen peroxidase is charged to the solution or suspension. At this point, hydrogen peroxide in solution or suspension is decomposed.

When one or more compounds are added from groups (B), (C), and (D) to the coating solution, the total concentration range desirable is between 0.001 and 5 wt%, and an especially preferred region is from 0.01 to 2 wt%. Lower amounts of these components will not be sufficient to achieve the desired scale preventive effect. Larger amounts tend to make the coating solution unstable, which also results in low efficiency of scale prevention.

An arbitrary combination of two or three compounds from groups (B), (C), and (D) further improves the scale preventive effect. In this case the concentration of each component should be more than 0.001 wt%, preferably more than 0.005 wt%. A lesser amount will not lead to an improved scale preventive effect by their combination.

When two kinds of compounds from groups (B), (C) and (D) are employed together, a combination of (B) and (C) groups gives the best result. Further addition from the (D) group to make a three component system can further improve the scale preventive effect.

The total solids concentration in the prepared coating solution usually ranges from 0.01 to 10 wt%, preferably from 0.05 to 3 wt%.

The prepared coating solution can form a coating on any part of a reaction vessel where scale may deposit, regardless of the construction materials employed therefor. The formed coating prevents scale deposition on these parts.

Formation of Coating Film

The following section describes a method to prepare coating films using the coating solutions prepared according to the above.

To prepare a coating film on a polymerization vessel's inner walls, the walls are covered with the prepared solution. After complete drying at a temperature in the region from room temperature to 100° C., these walls are usually rinsed by water. The resultant coating films will prevent scale deposition on the walls during polymerization.

It is also desirable to coat, with the solution, not only the inner walls but also other parts of the reactor with which monomers may contact during polymerization. The parts desirable to be coated include agitation blades, agitation shafts, condensers, headers, search coils, bolts, and nuts. Agitation blades, agitation shafts and baffles particularly require coating films from the solution. Coating films on these parts are prepared by similar methods described for the inner walls.

The coating is further desirable for parts which may collect polymer scale, although they may not contact with monomers during polymerization. These parts are inner walls of monomer recycling instruments and piping. Particular examples of these parts are the inside of monomer distillation towers, condensers, monomer storage tanks, and valves. Coating films on these parts are also prepared by similar methods described for the inner walls.

These coatings on the parts which may contact monomers, and on other parts which may deposit polymer scale, prevent scale deposition during polymerization. The particular type of coating method used to coat the reactor inner walls is not critical. Examples include brush coating, spray coating and methods involving the filling of a vessel with coating solution, followed by discharge of the solution. Automatic coating methods described in JA82-61001, JA80- 36288, JP81-501116, JP8-1501117, and JA84-11303 are also applicable.

Methods of drying surfaces wet by coating solution are also not critical and the following methods are applicable: a warm air blow method on the coated surface, and coating of preheated (30–80C.) surfaces of vessel inner walls and other parts. The dried coating surface is rinsed with water as necessary.

The desired amounts of dried coat obtained by the said methods are usually from 0.001 to 5 g/m$^2$, more preferably 0.01 to 3 g/m$^2$.

In the prior art, it is usually necessary to apply a fresh coating with the coating solution at every single, or after several batches, of polymerization. However, the prepared coating film of this invention has a high durability and a prolonged polymer scale preventive effect. Therefore, a new coating is usually required only once after several batches. The durable coating enables repeated usage of the polymerization vessel without polymer scale deposition.

Polymerization Process

After the formation of coating films on the polymerization vessel's inner walls and on other parts which may contact with monomers during polymerization, polymerization can take place within this vessel by conventional procedures. Namely, the first, compounds charged are monomers which have an ethylene type double bond expressed by the general formula (I), other appropriate polymer media, and dispersion agents for the monomers. Then polymerization initiates as usual.

Monomers applicable in this invention are expressed by the general formula (I). They include vinyl esters such as vinyl acetate and vinyl propionate; acrylic acid, methacrylic acid and their esters and salts; diene type monomers such as butadiene, chloroprene, and isoprene; styrene, acrylonitrile, alpha-methylstyrene, and vinyl ether.

Polymerization methods applicable to this invention are not limited to one type. This invention is effective, for example, for suspension polymerization, emulsion polymerization, solution polymerization, block polymerization, and gas phase polymerization.

A general procedure which is suitable is illustrated by the following examples of suspension polymerization and emulsion polymerization. Polymerization starts when a polymerization initiator (catalyst) and monomers are charged to the reactor in which water and dispersion agents are already placed. The inner pressure of the polymerization vessel usually reaches 0 to 10 kgf/cm$^2$g. During polymerization, water, dispersion agent, and one or two kinds of polymerization initiators are further charged as necessary. Polymerization is regarded complete when the reacted ratio reaches the goal, which is usually 80 to 100%. The usually employed weight ratio of reaction components, per 100 units of monomers, are 50 to 500 for water, 0.01 to 30 for dispersion agents, and 0.01 to 5 for polymerization initiators.

In the case of solution polymerization, polymerization media include organic solvents such as toluene, xylene, and pyridine, instead of water. Dispersion agents are also employed as necessary. Other conditions are usually the same as for suspension and emulsion polymerizations.

Block polymerization takes place at a temperature range from −10 to 250° C. Monomers and catalysts are charged after the atmosphere inside of the polymerization reactor is replaced by nitrogen gas or after the exhausting of inside air from 760 to 0.01 mmHg.

This invention is effective regardless of the materials used to construct the polymerization vessel's inner walls. For example, this invention is applicable to stainless steel vessels and vessels lined by glass.

There is no limitation to additives used in the polymerization system. The method of this invention is effective to prevent polymer scale deposition in polymerization mixtures which, for example, can further comprise: polymerization initiators such as t-butyl-peroxy neodecanoate, bis(2-ethylhexyl) peroxydicarbonate, 3,5,5-trimethylhexanoyl peroxide, alpha-cumylperoxy neodecanoate, cumene hydroperoxide, cyclohexanone peroxide, t-butylperoxy pivalate, bis(2-ethoxyethyl) peroxydicarbonate, benzoyl peroxide, lauroyl peroxide, 2,4-dichlorobenzoyl peroxide, diisopropylperoxy dicarbonate, alpha, alpha'-azobisisobutylonitrile, alpha, alpha'-azobis-2,4-dimethylvaleronitrile, potassium peroxodisulfate, ammonium peroxodisulfate, and p-menthane hydroperoxide; suspension agents such as partially-saponified polyvinyl alcohol, polyacrylic acid, copolymer of vinyl acetate and maleic anhydride, hydroxypropylmethyl cellulose as a cellulose derivative, gelatine as natural polymer, and synthesized polymer compounds; solid dispersive agents such as calcium phosphate, and hydroxy apatite; nonionic type emulsifiers such as sorbitan monolaurate, sorbitan triolate, and polyoxy ethylenealkyl ether; anionic type emulsifiers such as sodium lauryl sulfate and sodium dodecylbenzene sulfonate as sodium alkylbenzene sulfonates, and sodium dioctylsulfosuccinate; fillers such as calcium carbonate and titanium oxide; stabilizers such as tribasic lead sulfate, calcium stearate, dibutyl tin dilaurate, dioctyl tin methylcaptide; lubricants such as rice wax, stearic acid, cetyl alcohol; plasticizers such as DOP and DBP; free radical initiators such as t-dodecylmercaptan as mercaptans and trichloroethylene; and pH controlling reagents.

Particularly suitable reactions for applying the polymer scale deposit inhibitors of this invention are, for example, copolymerization of styrene and acrylic acid or its esters, copolymerization of styrene and methacrylic acid and its ester, emulsion and suspension polymerizations to manufacture polystyrene, ABS copolymerized resin, and synthetic rubbers such as SBR, NBR, CR, IR, and IIR.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding Japanese application 2-160294, filed June 19, 1990, are hereby incorporated by reference.

EXAMPLES

Examples marked by * in Table 2 are comparative.

Preliminary Preparation of Coating Solution

Cationic dyes are dissolved or dispersed into a solvent at a 0.2 wt% concentration. Hydrogen peroxide is added to this solution at the weight ratio ($H_2O_2$/cationic dye) listed in Table 1. Cationic dye is oxidized while stirring the solution at 20.C for 30 minutes. Preliminary solutions from numbers 1 to 31 were obtained by quenching oxidation of cationic dye (A) by the addition of hydrogen peroxidase to the mixture at the given weight ratio to hydrogen peroxide (listed in Table 1 as $H_2O_2$dase/$H_2O_2$)

Table 1 lists preliminary prepared solutions from No. 1 to No. 31. The type of cationic dye (A), weight ratio of hydrogen peroxide to cationic dye, the type of added hydrogen peroxidase, its weight ratio to hydrogen peroxide, and employed solvent type are tabulated for each solution.

TABLE 1

| Preliminary Solution No. | Cationic Dye | $H_2O_2$/cationic Dye Weight Ratio | Hydrogen Peroxidase | $H_2O_2$dase/$H_2O_2$ Weight Ratio | Solvent Weight Ratio |
|---|---|---|---|---|---|
| 1 | C.I.Basic Orange 2 | 1/1 | ascorbate oxidase | 0.05/100 | water/methanol (50/50) |
| 2 | C.I.Basic Orange 2 | 5/1 | none | N.A. | water/methanol (50/50) |
| 3 | C.I.Basic Orange 2 | 5/1 | ascorbate oxidase | 0.2/100 | water/methanol (50/50) |
| 4 | C.I.Solvent Red 109 | 1/1 | ascorbate oxidase | 0.01/100 | water/methanol (50/50) |
| 5 | C.I.Solvent Red 109 | 5/1 | catalase | 0.2/100 | water/methanol (50/50) |
| 6 | C.I.Solvent Red 109 | 5/1 | isocitrate dehydrogenase | 0.2/100 | water/methanol (50/50) |
| 7 | C.I.Solvent Black 3 | 0/1 | none | N.A. | methanol |
| 8 | C.I.Solvent Black 3 | 5/1 | none | N.A. | methanol |
| 9 | C.I.Solvent Black 3 | 5/1 | ascorbate oxidase | 0.2/100 | water/methanol (50/50) |
| 10 | C.I.Solvent Black 3 | 5/1 | laccalase | 0.2/100 | water/methanol (50/50) |
| 11 | C.I.Solvent Black 3 | 10/1 | catalase | 0.05/100 | water/methanol (50/50) |
| 12 | C.I.Solvent Black 3 | 10/1 | catalase | 0.5/100 | water/methanol (50/50) |
| 13 | C.I.Solvent Black 3 | 10/1 | peroxidase | 0.05/100 | water/methanol (50/50) |
| 14 | C.I.Solvent Black 3 | 10/1 | peroxidase | 0.5/100 | water/methanol (50/50) |
| 15 | C.I.Solvent Black 3 | 10/1 | peroxidase | 0.5/100 | water/methanol (50/50) |
| 16 | C.I.Solvent Black 23 | 0/1 | none | N.A. | methanol |
| 17 | C.I.Solvent Black 23 | 5/1 | catalase | 0.5/100 | water/methanol (50/50) |
| 18 | C.I.Solvent Black 23 | 5/1 | peroxidase | 0.5/100 | water/methanol (50/50) |
| 19 | C.I.Solvent Black 23 | 5/1 | ascorbate oxidase | 0.5/100 | water/methanol (50/50) |
| 20 | C.I.Solvent Blue 26 | 0/1 | none | N.A. | methanol |
| 21 | C.I.Solvent Blue 26 | 1/1 | catalase | 0.05/100 | water/methanol (50/50) |

TABLE 1-continued

| Preliminary Solution No. | Cationic Dye | $H_2O_2$/cationic Dye Weight Ratio | Hydrogen Peroxidase | $H_2O_2$dase/$H_2O_2$ Weight Ratio | Solvent Weight Ratio |
|---|---|---|---|---|---|
| 22 | C.I.Solvent Blue 26 | 5/1 | cytochrome oxidase | 0.5/100 | water/methanol (50/50) |
| 23 | C.I.Solvent Blue 26 | 5/1 | phosphate dehydrogenase | 0.5/100 | water/methanol (50/50) |
| 24 | C.I.Solvent Blue 26 | 5/1 | lactase dehydrogenase | 0.5/100 | water/methanol (50/50) |
| 25 | C.I.Solvent Blue 26 | 10/1 | peroxidase | 0.5/100 | water/methanol (50/50) |
| 26 | C.I.Solvent Blue 26 | 10/1 | peroxidase | 5/100 | water/methanol (50/50) |
| 27 | C.I.Basic Green 3 | 1/1 | catalase | 0.05/100 | water/methanol (50/50) |
| 28 | C.I.Basic Green 3 | 5/1 | catalase | 0.2/100 | water/methanol (50/50) |
| 29 | C.I.Basic Green 3 | 5/1 | catalase | 5/100 | water/methanol (50/50) |
| 30 | C.I.Basic Yellow 14 | 5/1 | catalase | 0.2/100 | water/methanol (50/50) |
| 31 | C.I.Basic Yellow 14 | 5/1 | catalase | 5/100 | water/methanol (50/50) |

EXAMPLE 1

Polymerization was performed within a 20 liter volume stainless steel polymerization reactor with an agitator. In each experiment number, parts with which monomers may contact during polymerization were coated with solutions described below. These parts are the inner walls of the reactor, agitation shafts, agitation blades, baffles, and others. The coating was dried at 50° C. for 15 minutes, and rinsed with water. Experiment No. 101 is a comparison example which did not use any coating solution at all.

As Table 2 indicates, experiment numbers from 102 to 114 utilized preliminarily prepared solutions in Table 1 alone as the coating solution. Experiment numbers from 115 to 133 used one to three components from the group of (B), (C), and (D), in addition to the solutions from Table 1.

Table 2 lists the preliminarily prepared solution number (Sol. No.) utilized for each experiment number (Exp. No.), along with the type and concentration ((B) Conc.) of (B) inorganic colloid, type and concentration of (C) water-soluble polymer compound, and type and concentration of (D) water-soluble organic acid.

After the formation of said coating, the polymerization vessel was charged with 8 kg of water, 5.2 kg of styrene monomer, 2.8 kg of methacrylic acid monomer, 8 g of partially saponified polyacrylamide, and 24 g of alpha, alpha'- azobisisobutylonitrile. Polymerization continued for 5 hours at 90° C. with continuous stirring.

After the polymerization, the amount of polymer scale deposited on the inner walls of the reactor vessel (polymer scale deposit) was measured. The results are summarized in Table 2.

TABLE 2

| Exp. No. | Sol. No. | Inorganic Colloid (B) | (B) Conc. (g/l) | Water-Soluble Polymer (C) | (C) Conc. (g/l) | Water-Soluble Organic Acid (D) | (D) Conc. (g/l) | Polymer Scale Deposit (g/m²) |
|---|---|---|---|---|---|---|---|---|
| 101* | none | none | none | none | none | none | none | 1200 |
| 102 | 3 | none | 0 | none | 0 | none | 0 | 36 |
| 103 | 5 | none | 0 | none | 0 | none | 0 | 30 |
| 104 | 9 | none | 0 | none | 0 | none | 0 | 11 |
| 105 | 10 | none | 0 | none | 0 | none | 0 | 23 |
| 106 | 14 | none | 0 | none | 0 | none | 0 | 8 |
| 107 | 15 | none | 0 | none | 0 | none | 0 | 14 |
| 108 | 17 | none | 0 | none | 0 | none | 0 | 7 |
| 109 | 22 | none | 0 | none | 0 | none | 0 | 23 |
| 110 | 23 | none | 0 | none | 0 | none | 0 | 19 |
| 111 | 24 | none | 0 | none | 0 | none | 0 | 17 |
| 112 | 25 | none | 0 | none | 0 | none | 0 | 9 |
| 113 | 28 | none | 0 | none | 0 | none | 0 | 33 |
| 114 | 30 | none | 0 | none | 0 | none | 0 | 25 |
| 115 | 11 | silver colloid | 1.0 | none | 0 | none | 0 | 10 |
| 116 | 11 | aluminum hydroxide colloid | 0.7 | none | 0 | none | 0 | 5 |
| 117 | 11 | aqueous type silica sol | 0.5 | none | 0 | none | 0 | 6 |
| 118 | 11 | aluminum hydroxide colloid | 0.7 | polyacrylic acid | 2 | none | 0 | 3 |
| 119 | 11 | aluminum hydroxide colloid | 0.7 | alginic acid | 5 | none | 0 | 4 |
| 120 | 11 | methanol silica sol | 0.5 | gelatin | 5 | p-toluenesulfonic acid | 0.5 | 1 |
| 121 | 11 | methanol silica sol | 0.5 | polyacrylic acid | 2 | p-toluenesulfonic acid | 0.3 | 0.1 |
| 122 | 11 | ethylene glycol silica sol | 0.5 | polyacrylic acid | 2 | phytinic acid | 0.3 | 0 |
| 123 | 11 | aqueous type silica sol | 0.5 | polyacrylic acid | 2 | phytinic acid | 0.1 | 0 |
| 124 | 11 | aqueous type silica sol | 0.2 | sodium carboxy methyl cellulose | 1 | p-toluenesulfonic acid | 0.5 | 0 |
| 125 | 15 | aqueous type silica sol | 0.2 | sodium carboxy methyl cellulose | 1 | oxalic acid | 0.5 | 0.3 |
| 126 | 22 | methanol silica sol | 0.2 | sodium carboxy methyl cellulose | 1 | maleic acid | 0.5 | 0.5 |
| 127 | 23 | methanol silica sol | 0.7 | sodium carboxy methyl cellulose | 1 | maleic acid | 0.5 | 0.5 |
| 128 | 24 | methanol | 0.7 | sodium carboxy | 1 | lactic acid | 0.5 | 0.3 |

TABLE 2-continued

| Exp. No. | Sol. No. | Inorganic Colloid (B) | (B) Conc. (g/l) | Water-Soluble Polymer (C) | (C) Conc. (g/l) | Water-Soluble Organic Acid (D) | (D) Conc. (g/l) | Polymer Scale Deposit (g/m²) |
|---|---|---|---|---|---|---|---|---|
| 129 | 25 | methylcellusolve silica sol | 0.7 | sodium polyvinyl sulfate | 1 | p-toluenesulfonic acid | 0.5 | 0.01 |
| 130 | 3 | methylcellusolve silica sol | 0.7 | sodium polyvinyl sulfate | 2 | p-toluenesulfonic acid | 0.2 | 0.1 |
| 131 | 28 | butanol silica sol | 0.5 | polymethacrylic acid | 2 | phytinic acid | 0.2 | 0.2 |
| 132 | 29 | butanol silica sol | 0.5 | polymethacrylic acid | 2 | phytinic acid | 0.2 | 0.1 |
| 133 | 31 | butanol silica sol | 0.5 | polymethacrylic acid | 2 | formic acid | 0.2 | 0.3 |

As can be seen, polymer scale deposit inhibitors of this invention effectively prevent scale deposition on reaction vessel inner walls during the polymerization and copolymerization of monomers which have an ethylene type double bond, expressed by general formula (I). These monomers have a high solubility towards coating films prepared with conventional polymer scale deposit inhibitors.

The polymer scale deposit inhibitors of this invention effectively prevent scale deposition even during the polymerization of monomers which have an extremely high solubility towards coating films prepared with the conventional polymer scale deposit inhibitors. These monomers include styrene, alpha- methylstyrene, acrylic acid, acrylic acid ester, and acrylonitrile. In addition, coating films prepared by these inhibitors possess high durability, namely, a prolonged polymer scale deposit preventive effect. Therefore, repeated use of the coated polymerization vessel becomes possible, which results in productivity improvements.

This invention also prevents scale deposition on stainless steel constructed polymerization vessels, which are known to experience deposit of polymer scale easier than glass-lined vessels.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for minimizing polymer scale deposition on surfaces during the polymerization of monomers which have an ethylene type double bond and are of the formulae $CH_2=CXY$ wherein
X is hydrogen or methyl
Y is hydrogen, alkyl, —COOH, —COOM, —COOR, —OCOR, —OR, —CN, —C$_6$H$_5$, —C$_6$H$_4$Z or —CH=CH$_2$,
M is an alkali metal or ammonium ion,
R is alkyl, and
Z is hydrogen, —OH, —CH$_3$, or —CH=CH$_2$;
comprising polymerizing said monomers in the presence of said surfaces coated with a film comprising a cationic dye oxidized with hydrogen peroxide, an inorganic colloid, a water-soluble polymer, and a water-soluble organic acid.

2. A method of claim 1, wherein said surfaces are reactor walls in contact with said monomers.

3. a Method of claim 1, wherein said cationic dye is C.I. Basic Red 2; C.I. Basic Blue 16; C.I. Basic Black 2C.I. Solvent Black 5 or 7; C.I. Basic Orange 14 or 15; C.I. Basic Blue 1,5,7 or 26; C.I. Basic Violet 3 or 14; C.I. Basic Blue 9, 24 or 25; C.I. Basic Yellow 1; C.I. Basic Green 5; C.I. Basic Red 12; C.I. Basic Yellow 11; C.I. Basic Yellow 2; C.I. Solvent Violet 8; C.I. Solvent Blue 2 or 73; C.I. Basic Blue 6 or 12; C.I. Solvent Yellow 2, 6, 14, 15, 16, 19, 21 or 56; C.I. Solvent Red 1, 8, 23, 24, 25, 27, 100, 109 or 121; C.I. Solvent Brown 3,5,20 or 37; C.I. Solvent Black 3, 22, or 23; C.I. Basic Orange 2; C.I. Basic Brown 1; C.I. Basic Violet 10; C.I. Basic Red 1C.I. Solvent Blue 55; C.I. Solvent Blue 11, 12 or 36; C.I. Dispersed Violet; or C.I. Solvent Green 3.

4. A method of claim 1, wherein said cationic dye in C.I. Solvent Black 3, 5, 7, 22 or 23; or C.I. Solvent Blue 2, 11, 12, 36, 55 or 73.

5. A method of increasing the resistance of a surface to polymer scale deposition during polymerization of monomers in contact therewith, wherein the monomers have an ethylene type double bond and are of the formula $CH_2=CXY$ wherein
X is hydrogen or methyl,
Y is hydrogen, alkyl, —COOH, —COOM, —COOR, —OCOR, —OR, —CN —C$_6$H$_5$, —C$_6$H$_4$Z or —CH=CH,
M is an alkali metal or ammonium ion,
R is alkyl, and
Z is hydrogen, —OH, —CH$_3$, or —CH=CH$_2$;
comprising, prior to said polymerization, coating said surface with an agent comprising a cationic dye oxidized with hydrogen peroxide, an inorganic colloid, a water-soluble polymer, and a water-soluble organic acid, whereby a film is coated from said reagent onto said surface.

6. A method of claim 5, wherein said surfaces are reactor wall sin contact with said monomers.

7. A method of claim 5, wherein said cationic dye is C.I. Basic Red 2; C.I. Basic Blue 16C.I. Basic Black 2; C.I. Solvent Black 5 or 7; C.I. Basic Orange 14 or 15; C.I. Basic Blue 1, 5, 7 or 26; C.I. Basic Violet 3 or 14; C.I. Basic Blue 9, 24 or 25; C.I. Basic Yellow 1; C.I. Basic Green 5; C.I. Basic Red 12; C.I. Basic Yellow 11; C.I. Basic Yellow 2; C.I. Solvent Violet 8; C.I. Solvent Blue 2 or 73; C.I. Basic Blue 6 or 12; C.I. Solvent Yellow 2, 6, 14, 15, 16, 19, 21 or 56; C.I. Solvent Red 1, 8, 23, 24, 25, 27, 100, 109 or 121; C. I. Solvent Brown 3, 5, 20 or 37;C.I. Solvent Black 3, 22 or 23; C.I. Basic Orange 2; C.I. Basic Brown 1; C.I. Basic Violet 10; C.I. Basic Red 1; C.I. Solvent Blue 55; C.I. Solvent Blue 11, 12 or 36; C.I. Dispersed Violet; or C.I. Solvent Green 3.

8. A method of claim 5, wherein said cationic dye is C.I. Solvent Black 3, 5, 7, 22 or 23; or C.I. Solvent Blue 2, 11, 12, 36, 55 or 73.

* * * * *